United States Patent [19]

Kraus et al.

[11] Patent Number: 4,819,501

[45] Date of Patent: Apr. 11, 1989

[54] SELF-ADJUSTING BRAKE MECHANISM

[75] Inventors: James R. Kraus, Hagerstown, Md.; Eugen O. Rothacker, Gerrardstown, W. Va.

[73] Assignee: Handy & Harman Automotive Group, Inc., Martinsburg, W. Va.

[21] Appl. No.: 180,496

[22] Filed: Apr. 12, 1988

[51] Int. Cl.[4] .......................... G05G 1/04; G05G 1/06
[52] U.S. Cl. .......................... 74/538; 74/535; 74/528; 74/523
[58] Field of Search ............... 74/523, 528, 535, 538, 74/540; 192/536, 111 A

[56] References Cited

U.S. PATENT DOCUMENTS

| | | | |
|---|---|---|---|
| 1,980,771 | 11/1934 | Tibbetts | 188/196 |
| 2,036,004 | 3/1936 | Wemp | 192/111 A |
| 2,616,540 | 11/1952 | Miller | 192/111 A |
| 3,109,320 | 11/1963 | Krautwurst | 74/529 |
| 3,302,482 | 2/1967 | Szajner et al. | 74/535 X |
| 3,307,667 | 3/1967 | Maurice | 192/111 A X |
| 3,365,042 | 1/1968 | Smirl et al. | 192/111 A |
| 3,621,959 | 11/1971 | Gale | 192/111 A |
| 3,972,247 | 8/1976 | Armstrong | 74/535 X |
| 4,181,209 | 1/1980 | Wheaton | 192/111 A |
| 4,311,060 | 1/1982 | Kawaguchi et al. | 74/538 X |
| 4,431,101 | 2/1984 | Limbacher | 192/111 A |
| 4,512,210 | 4/1985 | Gurney | 74/535 |
| 4,515,036 | 5/1985 | Dotson | 74/535 |
| 4,612,823 | 9/1986 | De Leeuw et al. | 74/533 |
| 4,671,400 | 6/1987 | Grunberg et al. | 192/111 A |

FOREIGN PATENT DOCUMENTS

| | | | |
|---|---|---|---|
| 388020 | 8/1951 | France | 74/538 |
| 2582272 | 11/1986 | France | 74/538 |
| 2583362 | 12/1986 | France | 74/538 |
| 111056 | 8/1981 | Japan | 74/538 |
| 218461 | 9/1986 | Japan | 74/528 |
| 2027142 | 2/1980 | United Kingdom | 74/538 |

Primary Examiner—Richard E. Moore
Assistant Examiner—Vinh Luong
Attorney, Agent, or Firm—Pennie & Edmonds

[57] ABSTRACT

An improved self-adjusting mechanism for a cable-operated vehicle brake is disclosed. The operating lever is pivoted about an axis on a frame member which carries a fixed sector. The lever carries a first pawl, which is adapted to releasably hold the operating lever in position with respect to the frame, and a second pawl which locks the lever to a sheave sector fixed to a sheave which winds up the brake cable upon pivoting of the lever. A third sliding pawl is mounted on the sheave sector. When the operating lever is rotated beyond a predetermined degree in setting the brake, the sliding pawl abuts a stop on the frame. This moves the sliding pawl with respect to the sheave sector. When the handle is subsequently returned to its rest position, the sliding pawl allows a limited amount of rotation of the sheave sector with respect to the lever, which occurs due to tension exerted on the brake cable by the brake shoe return spring. In this way predetermined limited amounts of slack in the cable are automatically taken up, and excessive spring force on the cable is avoided.

8 Claims, 3 Drawing Sheets

SELF-ADJUSTING BRAKE MECHANISM

FIELD OF THE INVENTION

This invention relates to an improved self-adjusting mechanism. More particularly, the invention relates to an improved self-adjusting mechanism for a cable operated device, such as an auxiliary or emergency brake for a motor vehicle.

BACKGROUND OF THE INVENTION

Federal law has for some years required that motor vehicles be fitted with auxiliary mechanical brake systems to supplement the hydraulic service brakes normally employed. Typically these auxiliary or "emergency" brakes are operated by a pivoted lever mounted for gripping by the driver's hand or as a pedal for depressing with the driver's foot. Commonly such operating levers are connected to the shoes of the mechanical brakes by flexible cables. Over time these cables tend to stretch, and the brake shoes wear, which can result in an inconvenient amount of lever travel being required to fully actuate the brakes. Accordingly, numerous patents have been issued directed to self-adjusting brake cable mechanisms.

For example, U.S. Pat. No. 3,109,320 to Krautwurst shows a relatively complex mechanism for automatically taking up the slack in a brake cable. As is commonly the case, the Krautwurst device involves a pawl-and-ratchet mechanism for locking the operating lever to set the brake. That is, when the operator desires to set the brake, he pulls on a lever attached to a sheave, which pulls on the cable, setting the brake. A pawl carried by the lever clicks over the teeth of a stationary ratchet. When the lever is moved a distance sufficient to set the brake adequately, the pawl holds the lever in the actuated position. When the operator then desires to release the auxiliary brake, he must pull the lever somewhat further and press a button or otherwise move the pawl out of engagement with the ratchet, so that the lever can move back to its rest position. This requires that some slack be left in the cable even after the brake is fully actuated.

The Krautwurst system takes up the slack resulting from cable stretch or brake wear at the brake end, that is, the slack is taken up during return of the lever to its rest position. This is done by altering the position of the cable with respect to the brake actuating member. This can result in no slack being available to allow releasing of the brakes.

U.S. Pat. No. 1,980,771 to Tibbetts shows a self-adjusting rod-actuated brake for a vehicle, the teachings of which would seem applicable to cable-operated brakes. The Tibbetts mechanism also involves adjustment on the return stroke; see p. 2, lines 56–61. This system would accordingly involve the same deficiencies noted with respect to the Krautwurst disclosure.

Numerous other cable adjusting mechanisms are also known to the art, many of which are disclosed in connection with automotive clutch cables. In many cases clutch actuation and auxiliary brake actuation mechanisms are comparable. However, it will be appreciated that normally the force required to actuate a clutch is much less than that required for actuation of brakes. Accordingly, the teachings of the clutch actuation art cannot necessarily be employed in auxiliary brake applications.

Patents generally teaching clutch adjustment mechanisms involving cables include Gale et al. U.S. Pat. No. 3,621,959; Wheaton U.S. Pat. No. 4,181,209; Grunberg et al. U.S. Pat. No. 4,671,400; and Smirl et al. U.S. Pat. No. 3,365,042.

Clutch actuation mechanisms which are less pertinent are shown in U.S. Pat. No. 3,307,667 to Maurice, showing an automatic adjustment device for a hydraulic actuated clutch, and Miller U.S Pat. No. 2,616,540 showing an automatic wear compensator for a directly actuated clutch, that is in which no cable is used. Wemp U.S. Pat. No. 2,036,004 also shows a self-adjusting mechanically actuated clutch mechanism.

An auxiliary brake actuator mechanism which is currently in commercial use appears to be generally as disclosed in the Gale patent, and suffers from the difficulties noted. This mechanism comprises a hand-operated lever which is rotatable about an axis on a frame member which is fixed to the vehicle. The frame member comprises a fixed sector, that is, an arcuate ratchet section, which interacts with a first pawl pivotally mounted on the control lever. The interaction of the first pawl with the fixed sector is such that the lever can be pivoted by the driver from a rest position about the axis to wind the brake cable around a sheave to set the brake. The pawl then holds the lever. When the operator later desires to release the brake, he presses a button which releases the first pawl from the ratchet and allows the lever to pivot back to its rest position.

In this device, the sheave is mounted concentrically with the axis of the lever. The sheave carries a sheave sector. A second pawl is also pivoted on the first lever and fixes the relative position of the lever with respect to the sheave sector. When the lever is returned to its rest position, that is, in order to release the brake, the second pawl is lifted by a stop. A heavy spiral spring (equivalent to spring 15 in the Gale patent) then rotates the sheave with respect to the lever, taking all slack out of the cable. When the brake is next actuated, the second pawl engages the sheave sector, locking the lever to the sheave. Not only does this mechanism allow all the slack to be removed from the system, preventing release of the brake in certain circumstances (that is, depending on the point at which the second pawl engages the sheave sector), but the heavy spring mentioned makes the system difficult to operate.

U.S. Pat. No. 4,431,101 to Limbacher shows an automatic adjusting mechanism for a clutch in which a clutch pedal is mounted for rotation concentrically with a second lever. The second lever directly actuates the clutch. The relative angular positions of the pedal and of the second lever about their axis are controlled by a pawl carried by the pedal and acting on a ratchet connected to the second lever. When the pedal travels more than a specified distance during actuation, the pawl is raised by a control member fixed to the vehicle, allowing the pedal to be moved with respect to the second lever. In this way their relative angular position is changed, and the pedal travel required subsequently to actuate the clutch is reduced.

The Limbacher patent thus shows adjusting the mechanism in response to travel of the pedal beyond a specified amount. This system would not appear to allow all the slack to be removed from the mechanism, in distinction to the system, shown in, e.g., the Krautwurst patent discussed above. Of course, the clutch mechanism of Limbacher does not require setting as does an auxiliary brake. Hence the problem of eliminating all slack and thereby preventing release of the brake does not arise. Moreover, the Limbacher mechanism is relatively complex and bulky, is not amenable to fitting into the limited physical space provided in modern vehicles for auxiliary brake actuation mechanisms, would require careful alignment of the control member fixed to the vehicle with respect to the remainder of the mechanism, thus requiring complex assembly steps, and would be relatively costly.

OBJECTS OF THE INVENTION

Accordingly it is an object of the invention to provide an improved self-adjusting mechanism for a cable-actuated brake or the like, in which there is no possibility of all the slack being taken up.

It is a further object of the invention to provide an improved brake cable actuator mechanism which is self adjusting on the engagement stroke, that is, as opposed to a system in which the slack is taken up on the return of the lever to its rest position.

It is a further object of the invention to provide an improved self-adjusting auxiliary brake mechanism as described above which can be manufactured by modification of a pre-existing design, whereby a substantial portion of the tooling used to make an existing auxiliary brake mechanism could be employed, and so that the improved mechanism is no more bulky than that previously in use, whereby the improved mechanism can be provided without redesign of the vehicle, and wherein the entire mechanism can be assembled to the vehicle as a unit in a simple and expedient manner.

SUMMARY OF THE INVENTION

The auxiliary brake actuator mechanism of the invention comprises an actuating lever which is pivoted with respect to a frame member mounted on a vehicle. The frame member carries a first fixed sector, that is, a section of teeth arranged as a ratchet. A second sheave sector is mounted on a sheave to which is attached the brake actuating cable. A first pawl mounted on the lever locks the lever to the fixed sector to set the brake. The second pawl locks the lever with respect to the sheave, so that the lever is operatively connected to the cable.

According to the invention, a third sliding pawl is provided, which provides automatic adjustment of the position of the sheave sector with respect to the lever, removing excess cable slack from the system. The sliding pawl is mounted on the sheave. If during the setting of the brake, the lever is rotated beyond a predetermined point, the sliding pawl abuts a stop mounted on the frame member, moving it with respect to the sheave. When the lever is subsequently returned to its rest position, the pawl locking the lever to the sheave sector is disengaged from the sector, allowing the position of the sheave with respect to the lever to be readjusted. Tension on the cable provided by the brake shoe return springs then rotates the sheave with respect to the lever. The sliding pawl then abuts a second stop mounted on the lever, thus limiting the maximum relative rotation of the sheave with respect to the lever when it is returned to its rest position. A controlled amount of slack is thereby removed from the cable. The amount of slack removed is thus responsive to the relative locations of the stops mounted on the frame member and the lever.

BRIEF DESCRIPTION OF THE DRAWINGS

The invention will be better understood if reference is made to the accompanying drawings, in which.

DESCRIPTION OF THE PREFERRED EMBODIMENT

Figure 1:
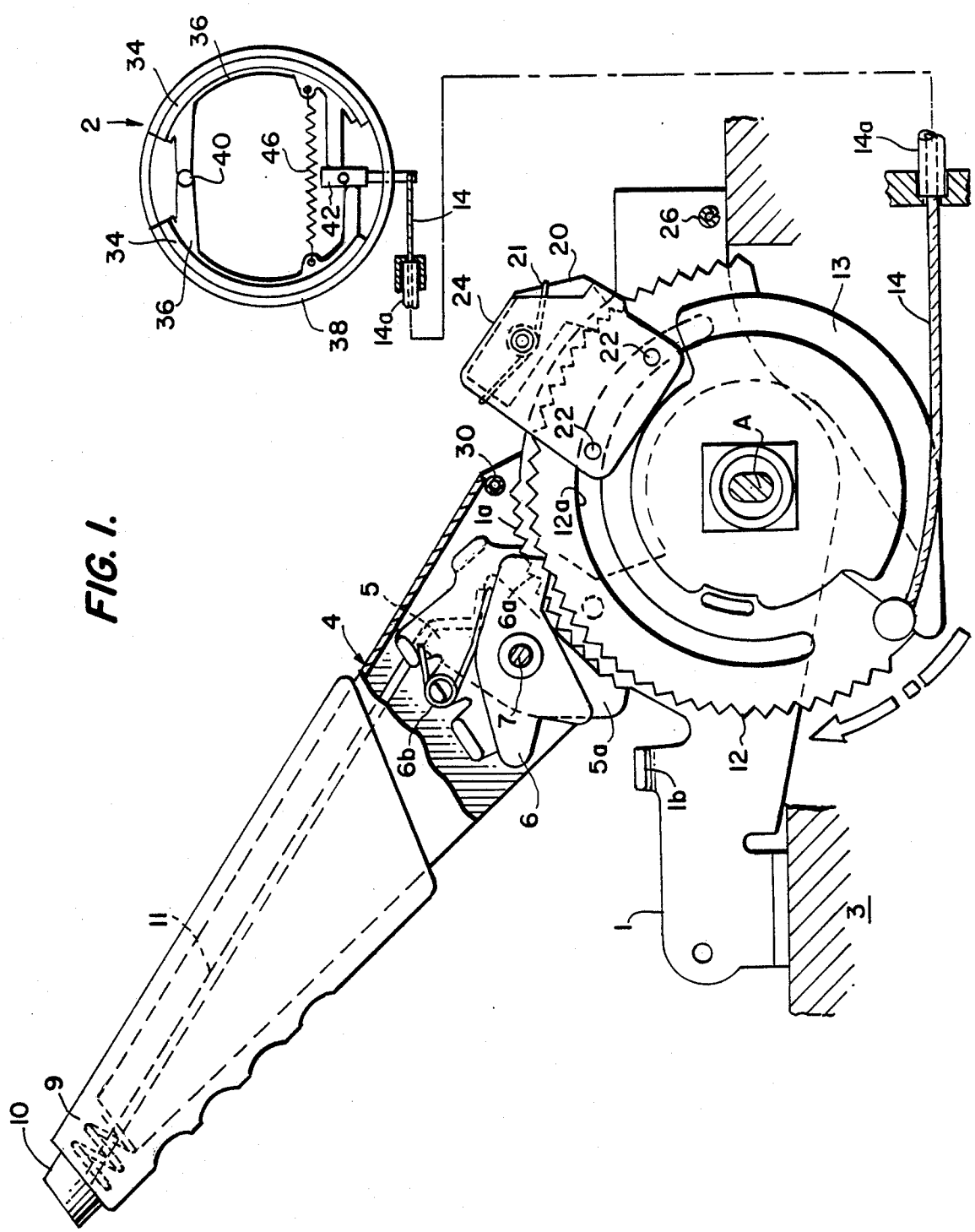
FIG. 1 shows an elevational view of the self-adjusting brake actuator of the invention in the brake set position, and its connection to an exemplary auxiliary brake assembly.
Figure 2:
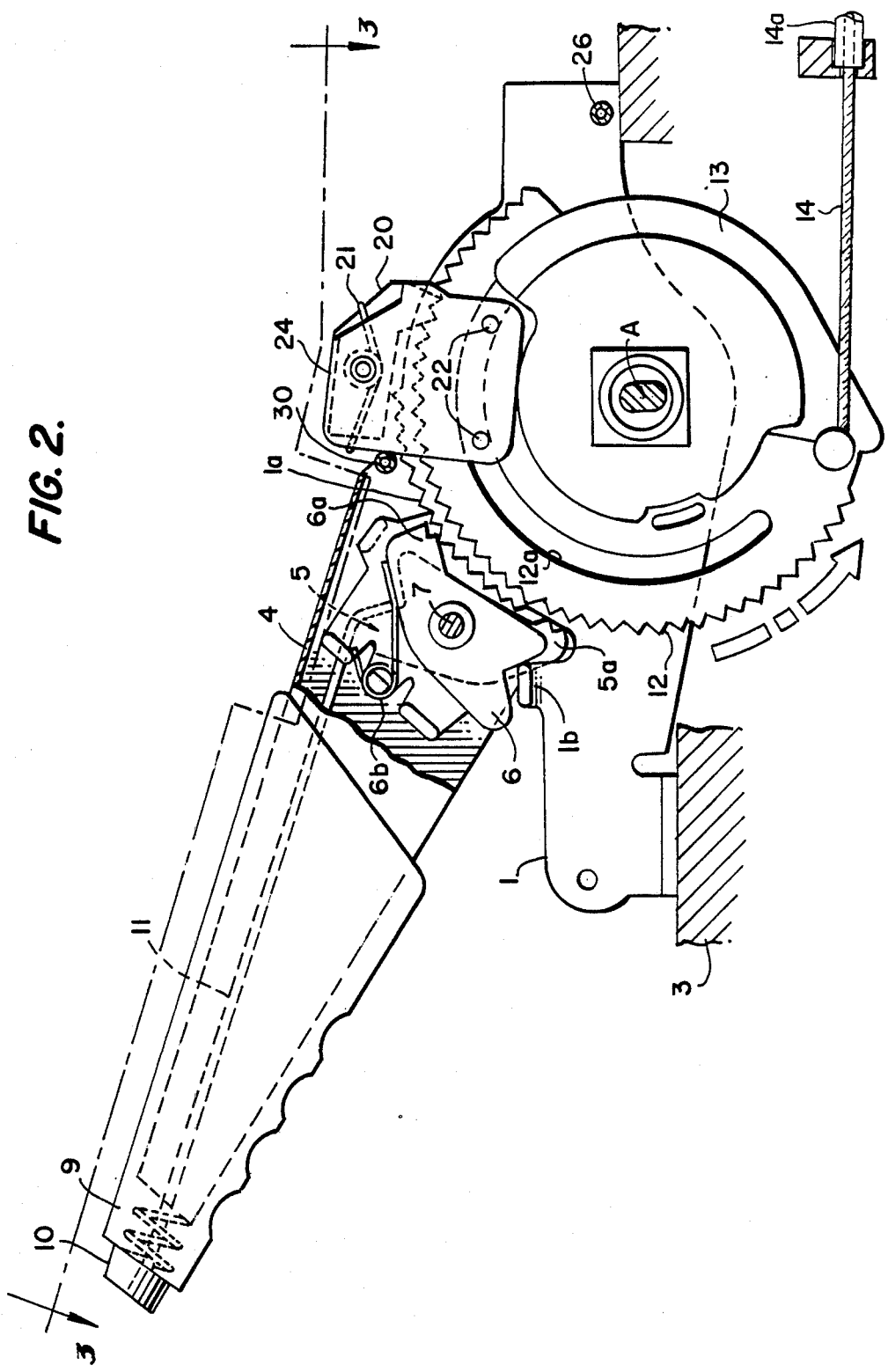
FIG. 2 shows a comparable view of the actuator of the invention in the rest position, in which the self-adjustment takes place.
Figure 3:
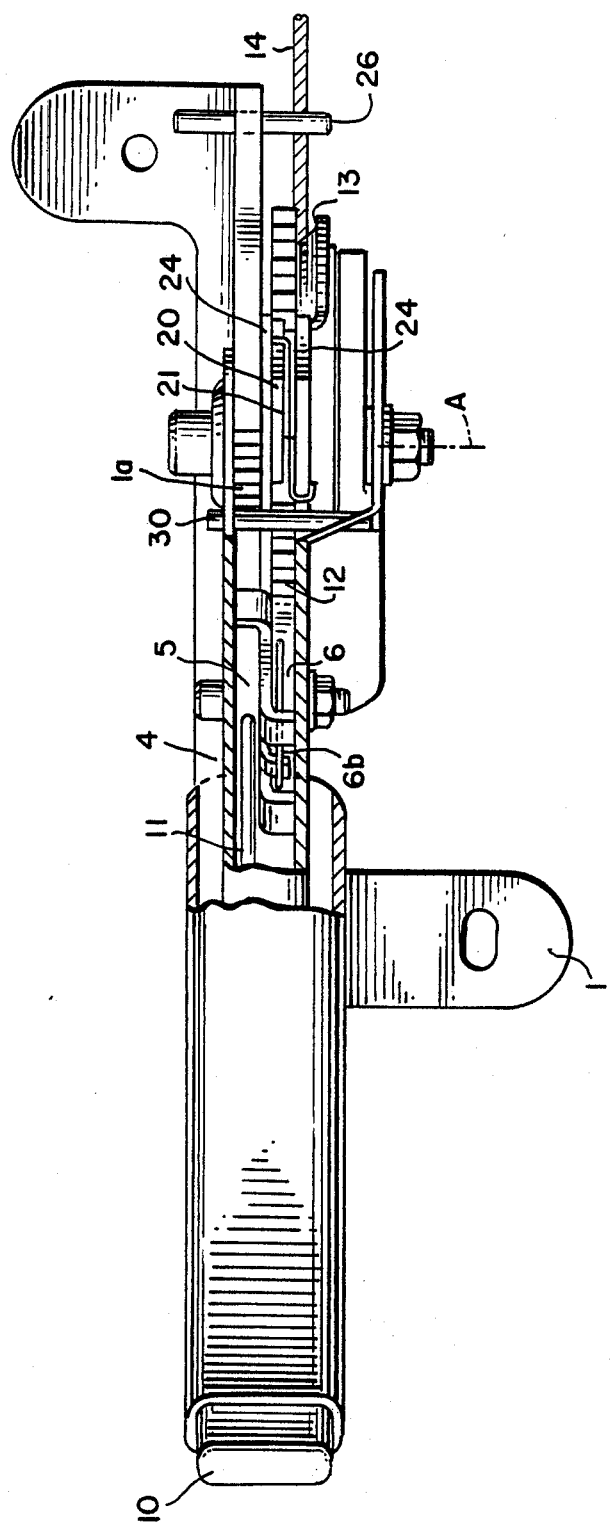
FIG. 3 shows a plan view along the line 3—3 of FIG. 2.

As mentioned, FIGS. 1 and 2 are elevational views of the self-adjusting brake actuating mechanism of the invention, in the brake set and rest positions respectively, while FIG. 3 shows a plan view. Reference should be made simultaneously to all three Figures for a full understanding of the invention. The mechanism shown has been simplified and modified with respect to its presently preferred embodiment thereof in certain details, which will be described below, for clarity of the view.

A frame member 1 is mounted to the vehicle as indicated generally at 3. The frame member 1 defines an axis A. Pivoted about axis A is a control lever 4 which is mounted for convenient operation by the driver of the vehicle, e.g., between the driver's and front passenger seats of a passenger car. Carried on the control lever 4 are a first pawl 5 and a second pawl 6. As indicated, these may be advantageously pivoted about a common pivot point 7, but this is not necessarily the case. The pawls 5 and 6 are biased downwardly against first and second sectors. The first sector 1a is formed as part of frame member 1, and is engaged by the teeth 5a of the first pawl 5. That is, when the lever 1 is rotated clockwise from a rest position, e.g. to set the brake, first pawl 5 moves over the teeth of sector 1a. When the lever has been rotated far enough to set the brake adequately, spring 9 urges the teeth 5a of pawl 5 into engagement with the sector 1a to hold the control lever 4 in the chosen position, as shown in FIG. 1. To release the brake, button 10 is depressed. Rod 11 then lifts the teeth 5a of pawl 5 out of engagement with sector 1a, allowing the lever 4 to be returned counterclockwise to its rest position.

The second pawl 6 is biased by a spring 6b so as to lock the lever 4 to a sheave sector 12 which is fixed to a sheave 13 which carries the brake cable 14. Cable 14 may be disposed within a sheath 14a so that it need not be straight. Accordingly, when the lever 4 is rotated clockwise sheave sector 12 likewise is rotated clockwise, winding the cable 14 upon sheave 13 and setting the brake 2. The relative positions of the sheave 13 and the lever 4 are thus defined by the pawl 6 while setting the brake and while it is set, as shown in FIG. 1.

Pawl 6 abuts a member 1b formed on the frame 1 when the actuating lever 4 is returned to its rest position, as shown in FIG. 2. This moves the teeth 6a of the pawl 6 out of engagement with the sheave sector 12, allowing the relative positions of the sheave 13 and lever 4 to be adjusted to remove cable slack. (At the same time the teeth 5a may rest on a portion of the frame 1 which does not have teeth formed therein, as shown in FIG. 2, but this is optional).

A typical auxiliary brake assembly 2 is also shown schematically in FIG. 1. A pair of brake linings 34 are mounted on brake shoes 36 to be juxtaposed to the cylindrical inner surface of a brake drum 38. One end of each of the shoes 36 is pivoted at a pivot 40 when a cam 42 is rotated by a lever 44, so that the linings 34 engage the drum 38 when tension is exerted on cable 14 by rotation of lever 4. A spring 46 ensures that the linings 34 pivot out of engagement with the drum 38 when tension on the cable 14 is relaxed by rotation of the brake lever 4 from the brake set position of FIG. 2 to the rest position of FIG. 1. Spring 46 thus applies tension to the cable 14 at all times.

According to the prior art, as exemplified by the commercial system according to the Gale et al patent, which is generally similar to the preferred embodiment of the invention described thus far with reference to FIGS. 1 and 2, a heavy spiral spring (corresponding to spring 15 of the Gale patent) is disposed between the sheave and the frame. When pawl 6 is pivoted upon return of the lever 4 to is rest position, releasing sheave 13 from the lever 4, this spring rotates the sheave 13 clockwise, taking the slack out of the cable. When the lever 4 is later moved from its rest position, pawl 6 again engages sheave sector 12 As noted above, in this system, all slack can be removed from the brake system, preventing the brake from being released Furthermore, the use of the spiral spring as the element which rotates the sheave 13 to take up the slack requires that this spring be quite heavy, since it must exert more tension on the cable than the brake shoe return springs. This can interfere with proper operation of the brake.

According to the present invention, the brake shoe return spring tension is employed for taking up a limited amount of slack when necessary, allowing elimination of the heavy sheave spring. Moreover, according to the invention, the relative adjustment of the sheave with respect to the lever effectively occurs during setting of the brake, preventing all the slack from ever being removed from the system.

According to the invention a sliding pawl 20 is provided, which is spring biased downwardly by a spring 21 between spaced members 24 against sheave sector 12. Members 24 are riveted by rivets 22 extending through arcuate slot 12a formed in the sheave sector 12, so that the pawl 20 slides around the sheave sector 12. As noted, the pawl 20 is pivoted downwardly to engage the teeth of the sheave sector 12, such that when the sheave sector 12 is rotated clockwise, that is, when the lever 4 is rotated to set the brake, the sliding pawl 20 also moves clockwise. Normal operation of the brake actuation assembly is as described above. However, if the cable stretches or the brake linings wear, so that in setting the brake the brake lever 4 is rotated through more than a predetermined degree of rotation, the spaced members 24 carrying the sliding pawl abut a pin 26 which is carried by the frame member 1. This forces the sliding pawl 20 counterclockwise with respect to the sheave sector 12. As described above, when the operating lever 4 is subsequently lowered to its rest position, stop member 1b abuts pawl 6 so that it pivots upwardly; this frees the sheave 13 from the handle 4. Tension provided by brake shoe return spring 46 then rotates the sheave 13 counterclockwise with respect to the lever 4. This rotation continues until spaced members 24 abut a second pin 30 carried by the lever 4, as shown in FIG. 2.

Therefore, according to the invention, if the sliding pawl assembly has been moved along the sheave sector by having abutted pin 26 during setting of the brake, the sheave 13 will thus be permitted to rotate to a limited degree with respect to the lever 4 when the lever 4 is returned to the rest position When this occurs, a predetermined amount of slack in the cable 14 is taken up.

The fact that the slack is taken up by the brake shoe return springs according to the invention permits elimination of the additional heavy spring required in connection with the commercial device just described in accordance with the Gale patent. Moreover, according to the invention, slack is taken out of the cable in predetermined amounts, limited by the motion of the sliding pawl along the sheave sector during setting of the brake. Therefore there is no possibility that insufficient slack will be available to allow the operator to release the brake.

More particularly, the relative positions of the pins 26 and 30 with respect to the spaced members 24 which abut these pins define the degree of rotation permitted to the lever 4 before the sliding pawl 20 is moved with respect to the sheave sector 12, and therefore also defines the amount of rotation permitted to sheave 13 upon return of the lever 4 to its rest position. Accordingly this relationship defines the minimum amount of slack remaining after adjustment.

According to the invention, therefore, a predetermined amount of slack is always left in the cable 14. In order to overcome friction in the system and to ensure ready rotation of the lever 4 to its rest position a spring 32 may be interposed between the sheave 13 and the vehicle. In practice this may be a spiral spring disposed about the axis A and connecting the sheave 13 to the frame 1 of the mechanism of the invention. In this embodiment this spiral spring is disposed similarly to that which is employed to remove cable slack in the commercial embodiment of the Gale et al patent. However, pursuant to the present invention the spring is provided for a different purpose. As noted, slack is removed from the cable according to the invention by the brake shoe return spring 46; this allows the spiral spring to be much lighter, so that it does not impede operation of the brake.

It will be appreciated that there are numerous improvements and modifications which can be made to the invention as disclosed without departing from its spirit and scope. In particular, while the self-adjusting mechanism of the invention has been described in connection with a rotating lever in which the sheave is coaxial with the lever, this need not be the case. It would be possible to provide a linear device wherein the motion of the operating lever and of the means whereby tension is exerted on a cable so a to actuate an associated mechanism both take place along a straight line. According to the invention, their relative positions are positively adjusted responsive to motion of the operating lever beyond a predetermined position. The self-adjusting mechanism of this invention could also be incorporated in foot lever designs.

Similarly, in the preferred embodiment, the fixed sector 1a and the sheave sector 12 are of similar diameters. They are shown as of differing diameters in FIGS. 1 and 2 for clarity. Either arrangement is workable. The pawls 5 and 6 need not be commonly pivoted as shown. Numerous other modifications and improvements will occur to those in the skill of the art.

Therefore, the above disclosure of the invention is not to be considered a limitation thereon but only as exemplary thereof. The invention is to be limited only by the following claims.

We claim:

1. A self-adjusting lever mechanism for applying tension to a cable, comprising:
    a frame member;
    a fixed sector, immobile with respect to said frame member, comprising a plurality of teeth;
    a control lever, movable with respect to said fixed sector from a rest position to an actuated position;
    a first pawl movable between an engaged position, in which said first pawl locks said control lever with respect to said fixed sector, and a disengaged position, in which said control lever can move with respect to said first sector;
    a cable sheave means, adapted to positively pull said cable with respect to said frame member to apply tension to said cable, and comprising a sheave sector;
    a second pawl, biased with respect to said sheave sector to lock said control lever to said sheave sector, such that motion of said lever in a predetermined direction from said rest position causes said sheave to pull said cable;
    means for causing said second pawl to release said sheave from said control lever when said control lever is returned to its rest position;
    a third pawl means, carried by and movable with respect to said sheave sector;
    means for moving said third pawl means with respect to said sheave sector in response to motion of said lever in said predetermined direction beyond a predetermined degree; and
    means for adjusting the relative rest position of said sheave with respect to said control lever when said lever is returned to its rest position responsive to motion of said third pawl means with respect to said sheave sector.

2. The mechanism of claim 1 wherein said first and second pawls are carried with said control lever.

3. The mechanism of claim 1, wherein said cable sheave is generally circular and is adapted to be rotated about an axis and to wind said cable thereupon in response to motion of said control lever in said predetermined direction.

4. The mechanism of claim 3 wherein said fixed sector is disposed along an arc concentric with the axis of rotation of said sheave, and said control lever is also mounted for rotation about said axis.

5. The mechanism of claim 1 wherein said cable is connected to operate an auxiliary brake system for a vehicle.

6. A self-adjusting auxiliary brake actuating mechanism for a vehicle, comprising:
    a frame member adapted to be affixed to said vehicle, defining a pivot axis and comprising a first arcuate fixed sector;
    a control lever, mounted for rotation away from a rest position with respect to said frame member about said pivot axis;
    a cable sheave, also mounted for rotation with respect to said frame member about said pivot axis, adapted for winding a brake cable thereupon in response to rotation in a first direction, and comprising a second arcuate sheave sector;
    a first pawl pivoted on said lever and biased to allow rotation of said lever with respect to said fixed sector in said first direction;
    release means, for pivoting said first pawl so as to allow rotation of said lever in the opposite direction with respect to said fixed sector;
    a second pawl pivoted on said lever and biased to lock said lever to said sheave sector whereby when said lever is rotated in said first direction, said sheave is likewise rotated, winding said brake cable thereon;
    means for pivoting said second pawl against said bias, whereupon said sheave is released from said lever when said lever is returned to its rest position;
    sliding pawl means riding with said sheave for defining the relative angular positions of said lever and said sheave when said lever is in its rest position and adapted to be moved with respect to said sheave sector when the rotation of said lever from its rest position exceeds a fixed amount; and
    means for rotating said sheave with respect to said lever when said sheave is released from said lever in its rest position to a degree responsive to the position of said sliding pawl means with respect to said sheave.

7. The mechanism of claim 6, when said means for rotating said sheave with respect to said lever comprises bias means mounted to exert tension on said brake cable.

8. The mechanism of claim 7, wherein said bias means comprises a brake shoe return spring mounted on said auxiliary brake.

* * * * *